FIG_1

Nov. 7, 1961    B. W. KLEIN    3,007,549
FRICTION CONTROLLING MEANS

Filed Nov. 18, 1957    11 Sheets-Sheet 2

FIG_3

FIG_2

INVENTOR.
BRUCE W. KLEIN.
BY John A. Young
ATTORNEY.

FIG. 6

FIG_8

INVENTOR.
BRUCE W. KLEIN.

FIG_9

United States Patent Office 3,007,549
Patented Nov. 7, 1961

3,007,549
FRICTION CONTROLLING MEANS
Bruce W. Klein, Green Island, Troy, N.Y., assignor to The Bendix Corporation, a corporation of Delaware
Filed Nov. 18, 1957, Ser. No. 697,042
16 Claims. (Cl. 188—78)

This invention relates to the combination of a friction controlling means with an organic liner, the combination being supported on arcuate brake shoes in a drum type brake.

Most of the currently commercial organic friction materials used on passenger cars, trucks, tractors, etc. are not satisfactory for the reason that they tend to lose effectiveness with increasing temperature. This condition is called "fade" and to the extent that the friction material does "fade" it becomes less efficient. The development of heat during braking is unavoidable because the brake converts the kinetic energy of the vehicle into heat. Some prior art devices propose to meet these problems of fade by devising more efficient means for dissipating braking heat, and thus maintaining operating temperature at a lower level. In contrast with this, the present invention proposes a simple friction liner arrangement which is capable of greater heat tolerance and is therefore more efficient at elevated temperatures.

There is a present urgent need for brake liners which can operate successfully at higher temperatures because the brake liners are being stressed more and more by the trend toward smaller wheels, shrouded wheel housings, faster and heavier vehicles, and automatic transmission drives in which the engine can exert far less retarding action on wheel rotation.

I have discovered that certain drum brake liner constructions which include organic segments and a small powdered metal base segment in the proper proportions, formulations and suitably disposed locations on an arcuate brake shoe will function to provide unexpected improvements in brake operation. These improvements in brake operation are particularly apparent in high temperature ranges at and above 400° F.–500° F. (soaking temperatures), this being the range in which most organic friction materials become ineffective.

Other objects and features of the invention will become more apparent upon consideration of the following detailed description which proceeds with reference to the accompanying drawings, wherein:

FIGURES 1 to 4 are various views of a servo type brake with which the invention has been extensively tested.

SERVO BRAKE CONSTRUCTION

Figure 1:
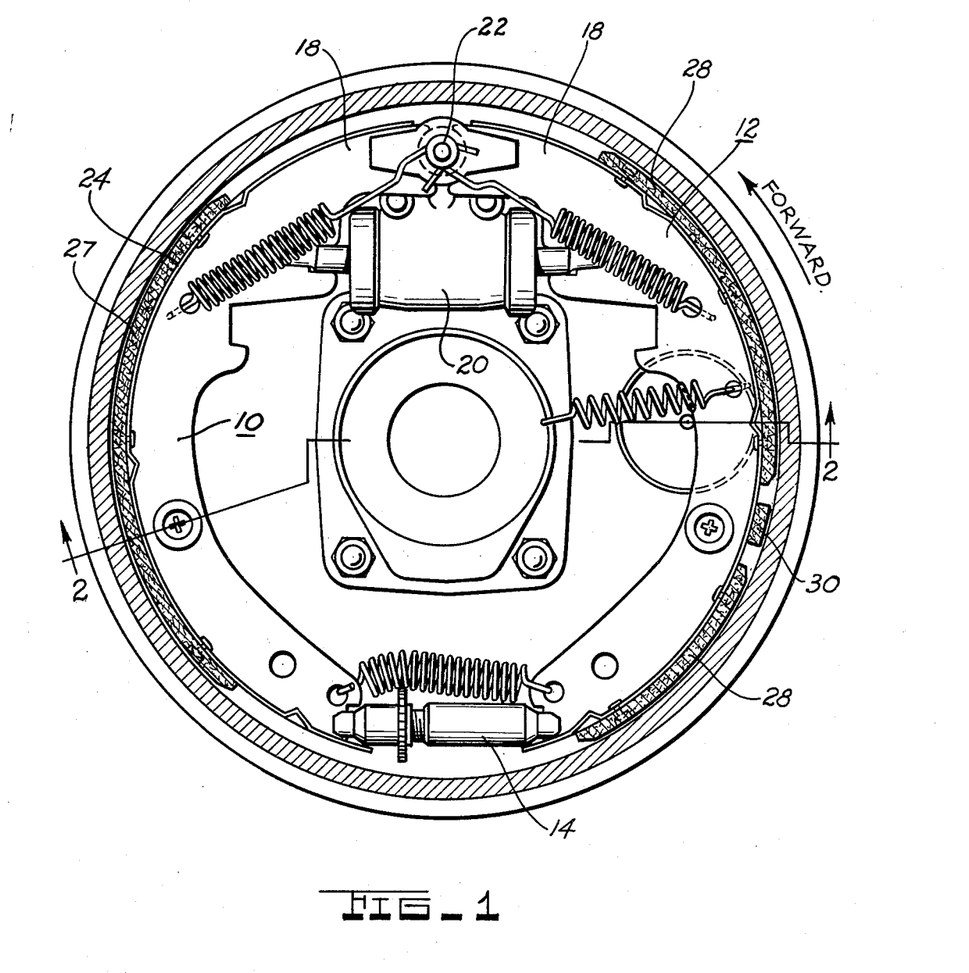
FIGURE 1 being a side elevation view of the servo brake, FIGURE 2 a section view taken on line 2—2 of FIGURE 1, FIGURE 3 an isometric view of the secondary shoe, FIGURE 4 an enlarged side view of the secondary shoe.
Figure 2:
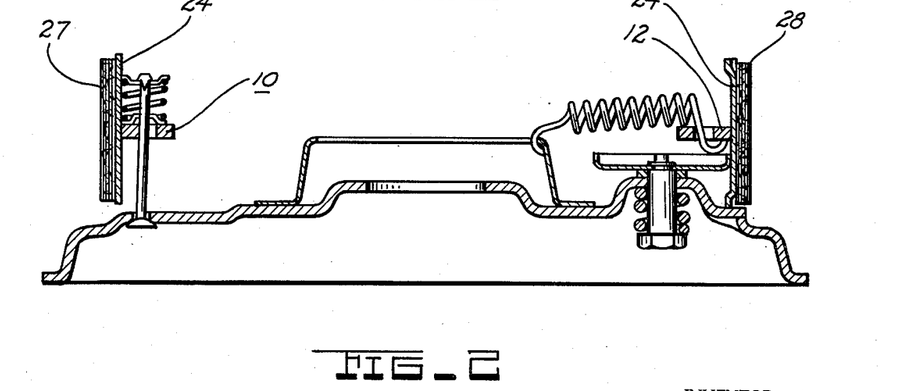

Most of the experimentation and evaluation surrounding the invention have been made with a servo brake of the type illustrated in FIGURES 1 and 2. The brake comprises a primary shoe 10 and a secondary shoe 12, which are joined at one end by an adjustable strut 14. Ends 18 of the shoes are applied by a wheel cylinder 20 and one or the other of the ends anchors on an anchor 22 depending on the direction of drum rotation.

On rims 24 of the shoes, there is brake friction liner material. The liner on the primary shoe 10 is indicated by reference numeral 27 and the liner of the secondary shoe 12 is indicated by reference numerals 28 and 30. Reference numerals 27 and 28 indicate the organic segments, and reference numeral 30 refers to the "wiper" segment.

Figure 4:
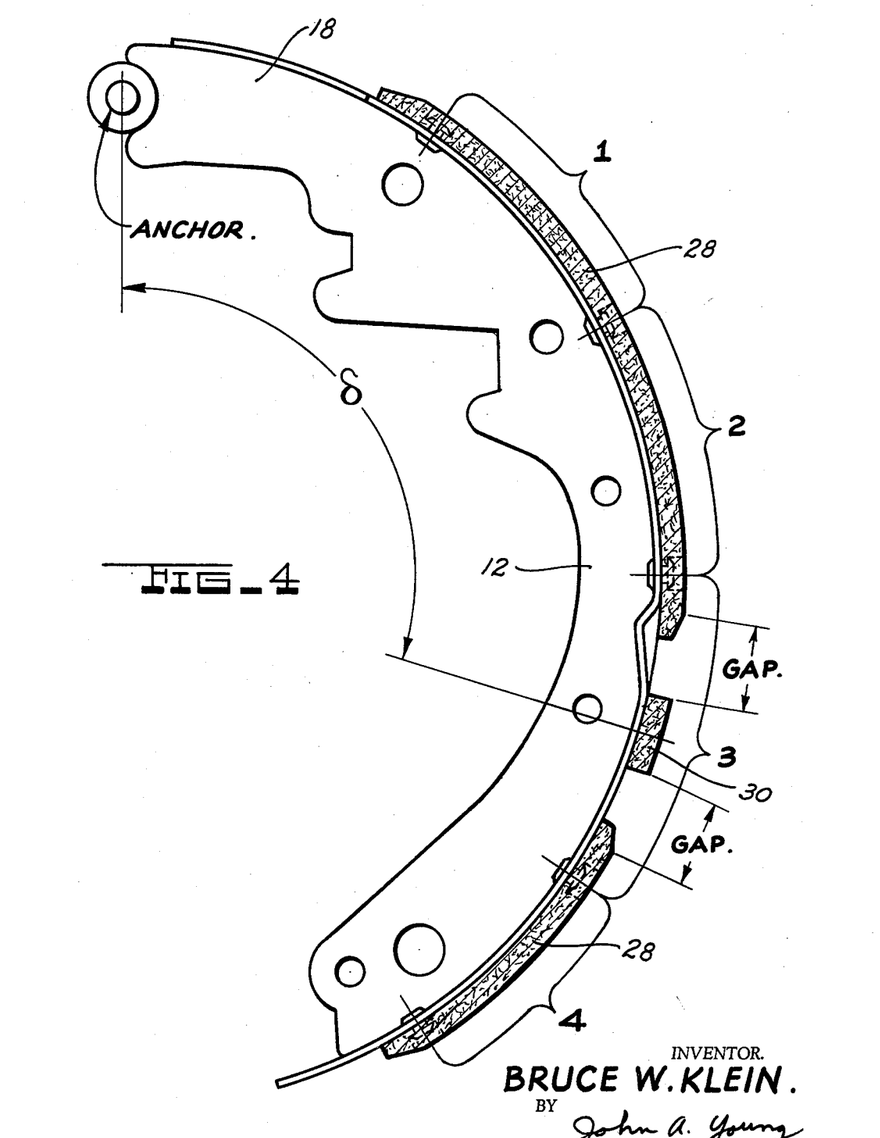

Referring to FIGURE 4, there is a numbering system dividing the arcuate length of the secondary shoe into various zones. This serves to conveniently identify the location of the wiper segment.

BRAKE PERFORMANCE

The brake construction described was used in obtaining the results shown in FIGURE 10, which will next be described. Three sets of liners were prepared and installed on the servo brake. These three sets of brakes were then subjected to the same tests. Lining 1 consisted of Formula "OB" on the primary shoe and Formula "OG" on the secondary shoe, both organic linings. (See Chart 6, Section *a*, in the Summary of Data near the end of this specification for exact ingredients and proportions.) Lining 2 was a full inorganic (metallic base) friction material "MH." (See Chart 6, Section *b*, in the Summary of Data.) Lining 3 was a combination of the organic (OB and OG) and inorganic (MH) materials, the metallic base wiper segment being of the size and placement indicated.

Figure 10:
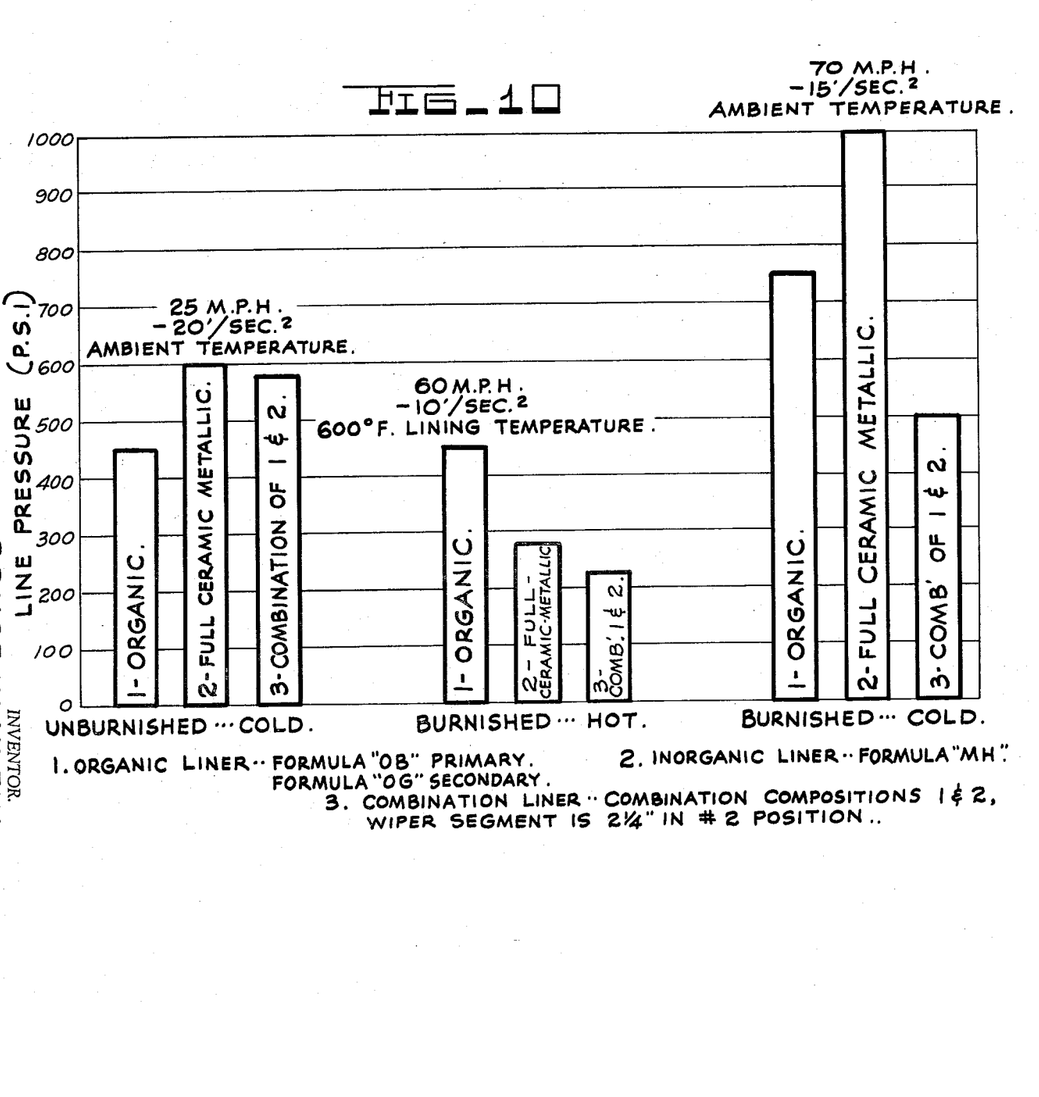
FIGURE 10 is a bar chart showing tests in summary form, which establish certain unexpected results of the invention.

The bars on the graph in FIGURE 10 indicate the amount of line pressure required to obtain a deceleration of 15 ft./sec./sec. from 70 miles per hour. The shorter the bar, the greater the effectiveness and conversely the longer the bar, the less the effectiveness.

Referring to the unburnished (lining not completely worn in) cold performance of the three brakes, it is surprising to note how closely the combination liner resembles the full metallic base liner in spite of the fact that the 2¼" segment represents only 18% of the secondary shoe lining and only 10% (approx.) of the entire shoe ring lining area.

Considering next the burnished, hot performance of the three liners, it is even more surprising to note that the combination is more effective than either the organic or inorganic lining materials used separately. Most surprising, however, is a comparison of the high speed burnished, cold performance of the three liners. In this instance, the combination is more effective than either the organic or inorganic liners used separately.

Figure 11:
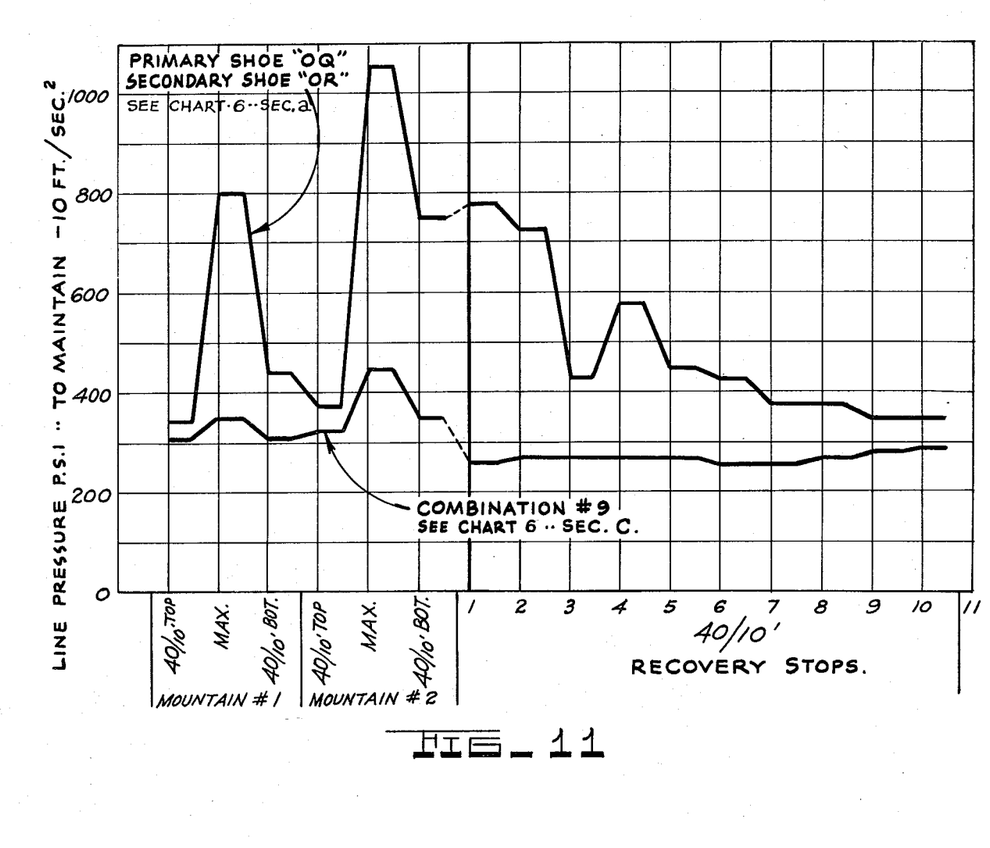
FIGURE 11 is a graph recording data taken from mountain driving. This data can be interpreted to indicate fade resistance and rate of recovery.

Referring next to FIGURE 11, there are compared a presently commercially used organic friction material lining and one of the lining constructions of this invention. Details of the compositions of the two lining materials are set forth in Chart 6, Section "*a*" for the organic, Section "*b*" for the wiper and Section "*c*" for the combination configuration.

The data has been taken from actual mountain driving. Two mountains in the Appalachian range which are particularly difficult to negotiate, owing to the steep road terrain and numerous sharp curves, were set out as a test course and have been used extensively as such in the industry. The line pressure readings above the notations 40/10′ in FIGURE 11 indicate the line pressures required to attain a deceleration of 10 ft./sec./sec. from an initial speed of 40 miles per hour. The first such reading was made at the top of the first mountain. The second such reading was made at the bottom of the first mountain. The intervening peak represents the maximum line pressure required for snubbing action of the brakes during the trip down the mountain at the maximum permissible driving speeds (about 55–65 miles per hour). The second series of line pressure readings marked, in order, 40/10; Max., and 40/10; indicates the same information with respect to the trip from the top to the bottom of the second mountain. The portion of FIGURE 11 marked "Recovery Stops" records the line pressures required for a series of complete stops from 40 miles per hour at a deceleration of 10 ft./sec./sec. The stops were made at one mile intervals, and the intervening driving speeds were maintained at substantially 40 miles per hour.

stantaneously is common to all of the constructions which are disclosed in Chart 6, Section c.

Two liners were made up, identical in construction and composition except that in the number "3" position of the secondary shoe in one liner there was an organic segment (of the same composition as the other material on the secondary shoe), and in the other liner there was a metallic base wiper segment. In all other respects the two liners were identical. The brakes were then separately tested under the same conditions and it was noted the liner with the wiper segment easily outperformed the same full organic material without the wiper segment.

After the test was completed with the metallic base segment liner, the wiper segment was removed, all of the dust which had generated during use was carefully preserved and returned to the brake cavity and the brake with the lining so modified was then re-tested. The net result of this test was that the liner was still as effective as the liner with the metal base wiper and was substantially improved over the full organic liner (which was of the same composition). The actual test results are set forth as follows:

*Chart 1.—Performance comparison of organic-inorganic linging combinations—Preliminary brake evaluation*

|  | Column 1 | Column 2 | Column 3 | Column 4 | Column 5 |
|---|---|---|---|---|---|
|  | Combination 16-A (Chart 6) ¾″ segment in #3 position (organic and inorganic), p.s.i. | Combination 16-A (Chart 6) Same lining as Col. 1 but inorganic segment removed after test and then re-run, p.s.i. | Combination 16-A (Chart 6) without inorganic segment replaced with ¾″ organic segment in #3 position, p.s.i. | Combination 32 (Chart 6) ¾″ segment in #2 position, p.s.i. | Combination 33 (Chart 7) ½″ segment in #2 position, p.s.i. |
| Hydraulic pressure required for 20′/sec.² deceleration from— |  |  |  |  |  |
| 25 m.p.h. | 620 | 550 | 600 | 550 | 600 |
| 50 m.p.h. | 660 | 600 | 800 | 550 | 650 |
| 70 m.p.h. | 730 | 700 | 900 | 610 | 700 |

Simulated First Hill

[Schedule consists of 10 brake snubs from 50 to 35 m.p.h. made each 25 seconds at the rate of 15′/sec.² deceleration. A check stop is made from 40 m.p.h. at start and end of this test. This check stop is made at 10′/sec.² deceleration]

| Start 40 m.p.h. 10′/sec.² decel. | 350 | 340 | 400 | 350 | 380 |
|---|---|---|---|---|---|
| Max. hyd. pressure 15′/sec.² decel. | 570 | 470 | 900 | 450 | 520 |
| Final 40 m.p.h. 10′/sec.² decel. (bottom of hill) | 430 | 280 | 830 | 320 | 330 |

COOL SIX MINUTES

Simulated Second Hill

[Schedule consists of 20 brake snubs as 20 second intervals, 60 m.p.h. to 45 m.p.h. The tenth is made at 18′/sec.² deceleration, all others at 15′ deceleration. A check snub made immediately before and after the test is made at 10′/sec.² deceleration from 40 m.p.h.]

| Start (top hill) 10′/sec.² decel. | 350 | 280 | 480 | 320 | 330 |
|---|---|---|---|---|---|
| Max. 15′/sec.² decel. | 570 | 550 | 1,000 | 550 | 700 |
| Tenth snub 18′/sec.² decel. | 430 | 800 | 1,100 | 650 | 850 |
| End (compare with start) 10′/sec.² decel. | 400 | 450 | 670 | 350 | 530 |

Recovery

| Recovery—10′/sec. decel. 40 m.p.h. and at 1 mile intervals | 1. 430<br>2. 390<br>3. 340<br>10. 350 | 1. 400<br>2. 330<br>3. 320<br>10. 270 | 1. 980<br>2. 780<br>3. 760<br>4. 650<br>10. 450 | 1. 400<br>2. 350<br>3. 300<br>10. 300 | 1. 550<br>2. 480<br>3. 400<br>10. 350 |
|---|---|---|---|---|---|

From the curves, it can be easily seen how the commercial fully organic liner lost effectiveness. Moreover, the lining did not recover until the seventh recovery stop. A liner construction incorporating the present invention, indicated as combination No. 9 in Chart 6 (Section c), was then run over the same test course and identically used. The very slight fade should be contrasted with that of the organic liner. Also, the almost instantaneous recovery of the combination liner should be contrasted with that of the full organic liner. This very unusual but advantageous ability of the liner constructions of this invention to recover almost instantaneously is common to all of the constructions which are disclosed in Chart 6, Section c.

This evidence tends to show that the wiper segment is not important for whatever braking contribution it might itself make but rather for the modification it makes at the interface between the drum surface and working surface of the arcuate shoes.

It can also be shown mathematically that the small arcuate length segments, of the sizes which are used, viz., fro ⅜″ to 2¼″ long in 11″ and 12″ diameter brakes, can contribute only a very small fraction of the total braking work, even where there is a considerable difference in effectiveness between the organic and metallic base segments.

Figure 12:
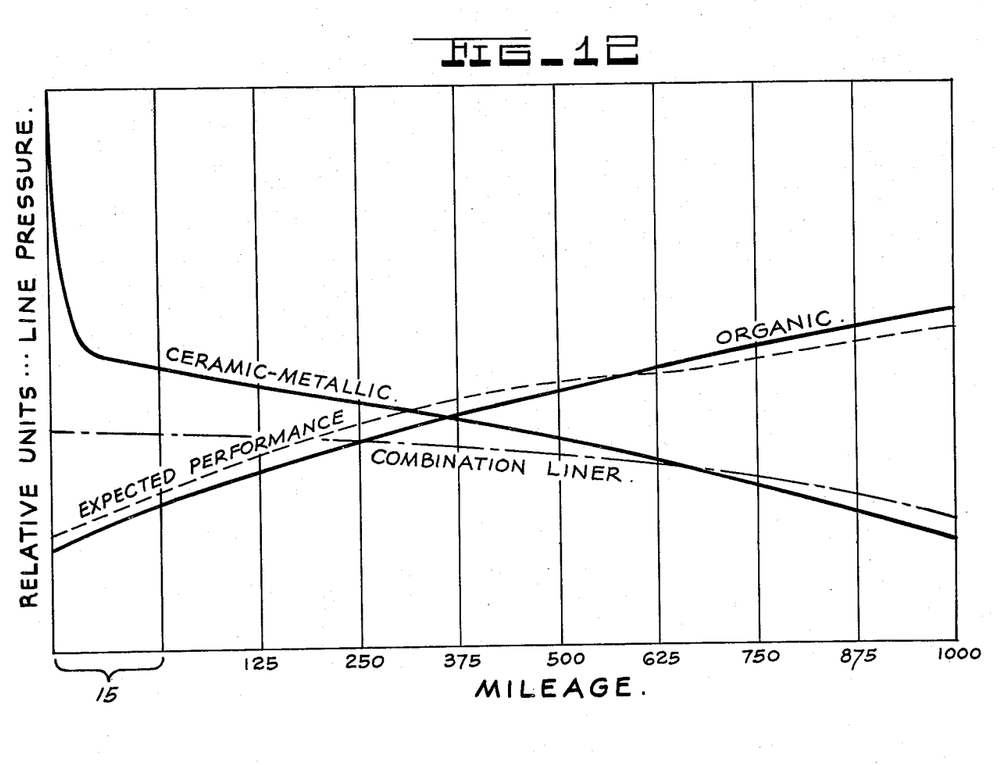
FIGURE 12 is a graph which shows, in a general way, the variation in brake effectiveness which occurs over an extended period of use of the brake.

The effect of the wiper segment is apparent throughout the service life of the brake. In FIGURE 12 there is shown a LINE PRESSURE vs. Mileage graph, the line pressure being indicated in relative units. Brake effectiveness is inversely proportional to the line pressure.

The first 15 mile interval is greatly exaggerated and is out of scale with respect to the mileage thereafter. The full metal base friction material (designated "Ceramic-Metallic") is very ineffective when first installed on the automobile. It initially increases very rapidly and thereafter gradually increases in effectiveness with continued use. The organic liner on the other hand is initially much more effective than the metal base material but becomes steadily less effective. Based on the relative area change when a small wiper segment is added to the organic, it would have been predicted that the performance change would follow the path labeled "Expected Performance." Instead the performance of the liner construction having both the organic lining and the wiper segment (designated "Combination Liner") follows more approximately that of the full metallic base friction material. Initially, it is approximately midway in effectiveness between the two other liners, but with continued use it substantially parallels in its effectiveness the full metallic base friction material.

The new and unexpected results of the invention having been outlined, there will next be described the three chief structural factors: (1) segment size, (2) placement and (3) gap.

(1) SEGMENT SIZE

The segment size varies with brake size. In an 11" diameter servo brake (which is selected only as an example), the segment size varies from about 2¼" arcuate length to about ⅜" arcuate length. This range of arcuate lengths represents from about 18% to about 3% of the total lining area (organic and wiper segment) on the secondary shoe. This represents from about 24° to about 4° of the drum circumference.

The efficiency of the wiper segment does not appear to be improved by increases in its size above 18% of the secondary shoe lining area. Within this size range of 3%–18% of the secondary shoe lining area, the wiper can itself function only insignificantly as a braking surface. Therefore brake performance must be determined almost exclusively by the organic segments as modified by the wiper segment. At the upper portion of the range, the wiper segment tends to become noticeable as a functioning braking surface. To avoid this the segment is suitably located on the secondary shoe. This will be discussed more fully hereafter.

When the wiper segment is increased above the specified size range, then the performance of the brake develops noticeable noise, drum wear increases, and buildup in effectiveness occurs. These are properties commonly associated with the metallic base friction materials, so it is likely that above the specified range in size the wiper segment begins to assume a recognizable braking function and therefore begins to impart certain of its undesirable and predictable properties to the brake performance.

The upper limit in size of the wiper segment is established then by taking into consideration the aim of providing sufficient wiper segment area to operate efficiently as a modifier of the organic segments while limiting its amount so that it contributes only negligibly to brake performance and the undesirable properties of the segment are not manifested.

The lower limit of the segment is dictated to a large extent by handling difficulties. There is only a slight saving in material by decreasing a wiper from say ⅜" or ½" arcuate length to a size less than these lengths, but in doing so the processing and attachment problems are greatly complicated. There is also a decrease in efficiency of the wiper segment in sizes below ⅜" arcuate length so that the benefits of the segment as a friction modifier are considerably reduced. Taking into account both wiper efficiency and handling requirements, the lower limit of wiper segment size is established at about ⅜" or 3% of the secondary shoe lining area.

The preferred range in arcuate length of the wiper segment in an 11" diameter brake is from about ½" to about 1¼"; or from about 4% to about 10% of the total lining area of the secondary shoe.

The optimum size of the segment is dependent upon both the composition and placement of the wiper segment in the shoe ring.

From extensive tests, it is known that the optimum size of the wiper segment tends to be smaller where the wiper segment is located in the zone of higher drum engagement pressure.

Figure 5:
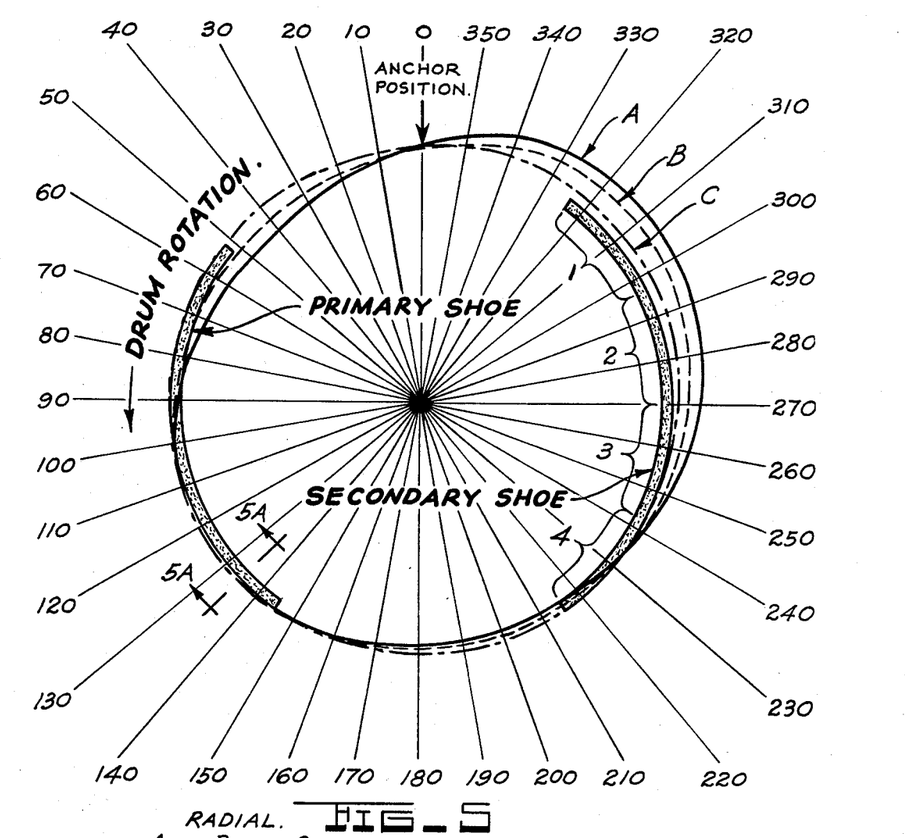
FIGURES 5 and 5A are detail views of the drum shapes assumed with the servo type brake.
Figure 5A:
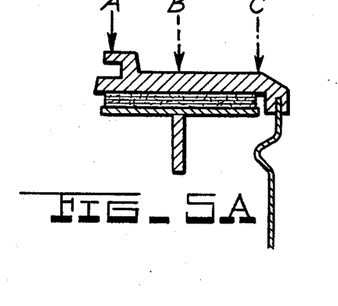

Refer to FIGURES 5 and 5A which show the distortion pattern of the drum used with the servo type brake shown in FIGURES 1–4. From the distortion pattern, it is known that the pressure of drum engagement by the lining supported on the secondary shoe increases approaching the anchoring end of the secondary shoe. Thus (referring to FIGURE 4), the portion of the brake lining on the secondary shoe 12 in the No. 1 position will be engaged with the drum under a higher pressure than would the same portion of lining in the No. 4 position. It has been found that the optimum size of the wiper segment depends upon its location on the shoe and the only basis for distinguishing one location from another on the shoe is the pressure of engagement.

Referring back to Chart 1, and comparing Columns 1, 4 and 5, a ¾" wiper segment becomes more effective when it is moved from the No. 3 position on the secondary shoe to the No. 2 position. The ½" wiper in the No. 2 position is slightly more effective than a ¾" wiper segment in the No. 3 position. Comparing Columns 4 and 5, it will be seen that, with both in the same No. 2 position, the ¾", or larger wiper segment is, as would be expected, more effective than the ½", or smaller, segment.

The matter of optimum size of wiper segment is closely related therefore to position on the brake shoe.

(2) WIPER SEGMENT PLACEMENT

As pointed out previously, the wiper segment operates with greater effect in its modifying action on the organic segments when it is placed at a location of greater pressure of engagement with the drum. This means that a wiper segment becomes more influential owing to increased modifying of the organic lining as it is moved from the No. 4 position (FIGURE 4) closer to the anchor.

Different wiper segments will, of course, have an optimum position depending upon their individual size and composition which determines their "wiping" ability. Also of importance is the ability of the wiper segment to withstand the pressures and temperatures which occur at the particular location. Each increment of arcuate lining length contributes a portion of the total torque and the value thereof varies around the arcuate length and is proportional to the engagement pressure.

MATHEMATICAL ANALYSIS OF INVENTION

To assist in explaining the invention, suitable mathematical formulae having been derived which illustrate (1) that the wiper segment serves as an interfacial friction modifier, and (2) the correlation of wiper segment size and placement.

The length of the arcuate segment can best be established from the following mathematical relation:

(1) $$L = \left(\frac{k_1}{1-k_1}\right) \times \frac{12 T_0}{(R_D D_2 W \mu_m \sin \delta)}$$

where $\delta$ varies between 0 and $\pi$, $$k_1 = \frac{T_m}{T_0}$$

$T_m$=torque derived from wiper segment, and $T_0$=total allowable braking torque.

Thus $k_1$ is equal to the ratio of area "A" to the total area.

$R_D$=the inner radius of the drum (inches).

$D_2$=maximum unit pressure (pounds per in.$^2$) on the secondary shoe between the liner and swept drum surface.

$\mu_m$=coefficient of friction of the wiper segment which has a lower limit of 0.15.

$\delta$=angular displacement of the midpoint of the wiper segment from the anchor.

$W$=swept width of the drum (in inches), and $L$=arcuate length of the wiper segment (in inches).

It is known from numerous tests that the invention works to best advantage when $k_1$ has a value no greater than 0.10 or when the wiper contributes no more than 10% of the total braking torque. This relation applies when the friction material has a coefficient of friction of about 0.15. For other friction materials, the value of $k_1$ can also differ. The maximum length L is established with the value of 10% for $k_1$ and the metallic base wiper segment being 0.15 coefficient of friction. Above 10%, the wiper segment begins to assume a noticeable braking function and imparts the undesirable qualities generally associated with this type of friction material.

As an example calculation for the upper length L of this particular brake at any given position of the wiper, it is necessary only to substitute 0.10 for $k_1$, which has been established by test, into the relation set forth. Using the values: $\delta=106°$ (the position shown in FIGURE 1); $R_D=5.5''$; $T_0$ and $D_2$ as calculated assuming 0.3 as the coefficients of friction of the organic primary and secondary liners and 0.15 as the coefficient of friction of the wiper segment; and $W=2.5$ inches; it is found that $L=2.42$ inches. This corresponds very well with experimental results which establish the maximum value for L as 2.25 inches.

The relationship is thus useful in calculating an approximate upper limit length for the wiper segment at any given position and applies generally regardless of the brake size. By means of this analysis, the selection of location and size need not be a random procedure. With given friction materials, these equations permit the tieing together of wiper segment placement and size. The overall consideration is that the segment must not be of such a size at any given location as to become a noticeable or significant functional braking surface, in order to avoid excessive noise, drum wear, and effectiveness buildup during the stop.

Figure 3:
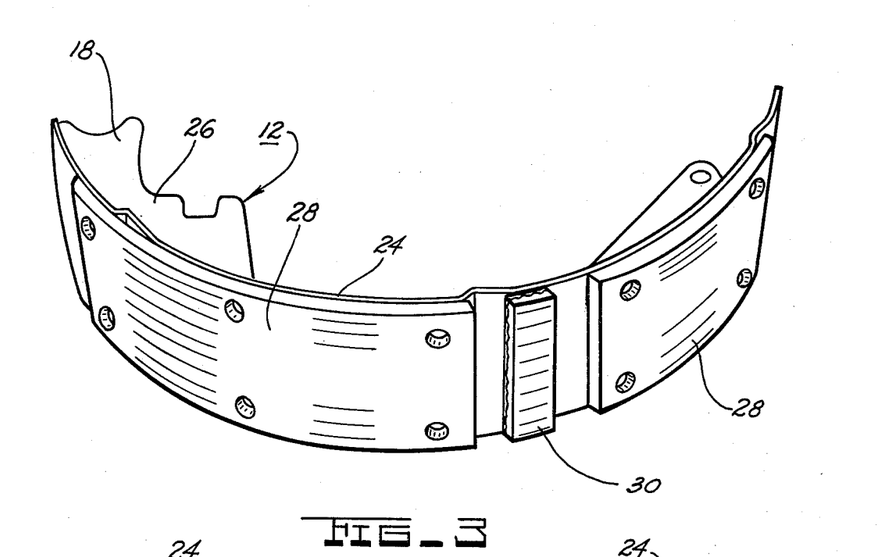

The derived equations are applicable to the servo brake in FIGURES 1–3; other equations can also be derived for the brake configurations shown in FIGURES 6–9.

Chart 2.—Showing effect of additions of graphite and ceramic to the basic metal (powdered copper) segment

[Organic materials—primary lining "OA"; secondary lining "OG"; wiper segment is ¾" in #3 position. 11" x 2" brake, Servo]

| Amounts of ingredients | | | Average effectiveness factor (K) | | Fade test—12 stops | | Recovery test—10 stops | | | |
|---|---|---|---|---|---|---|---|---|---|---|
| Matrix (copper), percent | Graphite, percent | Ceramic, percent | 30 m.p.h. | 60 m.p.h. | Min. effectiveness expressed in terms of the percentage of original effectiveness, percent | Occurred on stop No. | Min. effectiveness expressed in terms of the percentage of original effectiveness, percent | Stop No. | Max. effectiveness during recovery expressed in terms of percentage of original effectiveness, percent | Stop No. |
| 100 | 0 | 0 | 3.78 | 3.12 | 71.3 | 6 | 64.4 | 4 | 74.4 | 10 |
| 97 | 3 | 0 | 3.96 | 3.80 | 40.0 | 12 | 64.5 | 1 | 76.4 | 3–9 |
| 94 | 6 | 0 | 3.08 | 2.86 | 57.6 | 12 | 80.5 | 1 | 93.5 | 8–9–10 |
| 91 | 9 | 0 | 3.14 | 2.96 | 63.8 | 12 | 63.0 | 1 | 87.9 | 9 |
| 88 | 12 | 0 | 2.98 | 2.82 | 60.0 | 11 | 69.0 | 1 | 85.3 | 10 |
| 88 | 9 | 3 | 3.4 | 2.92 | 56.2 | 8 | 85.3 | 1 | 107.3 | 10 |
| 85 | 9 | 6 | 3.3 | 3.02 | 55.8 | 12 | 61.6 | 3 | 73.5 | 1–2 |
| 79 | 9 | 12 | 4.4 | 3.6 | 98.3 | 5 | 132.0 | 5–6–7–8–9 | 161.0 | 1–2 |

Considerable work has also been done with ceramics other than calcined kyanite (mullite). On the basis of the experimental results, it has been found that raw, or uncalcined, kyanite, and magnesite are substantially the equivalents of mullite for this purpose. Where powdered iron is the metallic base material, additions of bismuth are also made for best results. A partial summary of the ingredients which have been tried in various combinations is set forth as follows, with the indicated results:

Chart 3

| | Comb. No. 41 | Comb. No. 40 | Comb. No. 42 | Comb. No. 44 | Comb. No. 45 | Comb. No. 46 | Comb. No. 16 |
|---|---|---|---|---|---|---|---|
| Copper | | * | | * | | | |
| Iron | * | | * | | * | * | * |
| Mullite | | | * | * | | | * |
| Kyanite | * | | | | * | * | |
| Bismuth | * | | | * | | * | * |
| Graphite | * | * | * | * | * | * | * |
| Magnesite | * | | | | | | |
| Results | Good in every respect. | Good in every respect. | Good fade, good eff., poor rec. | Good in every respect. | Poor eff., poor fade, good rec. | Good in every respect. | Good in every respect. |

Other equivalent abrasive oxide ceramics which are selected from the class to which the example ceramics belong may also be used. For best results, graphite should be included regardless of the metal base ingredient.

3. GAP

By gap is meant the clearance or discontinuity between the wiper segment and the adjacent ends of the organic segments. The importance of the gap is that it ensures contact of the wiper segment with the opposing drum surface in spite of swelling or change in volume of the adjacent organic segments. The gap ensures the described contact inasmuch as both the shoe and drum will deflect during brake application.

The criticality in gap size decreases with increasing arcuate length of the wiper segment.

Another consideration in gap size is the organic liner thickness and the location of the wiper segment. The higher the pressure area the less the gap required because the higher pressure produces sufficient shoe and/or drum distortion to permit contact of the wiper segment in spite of swelling of the organic segments.

Figure 7:
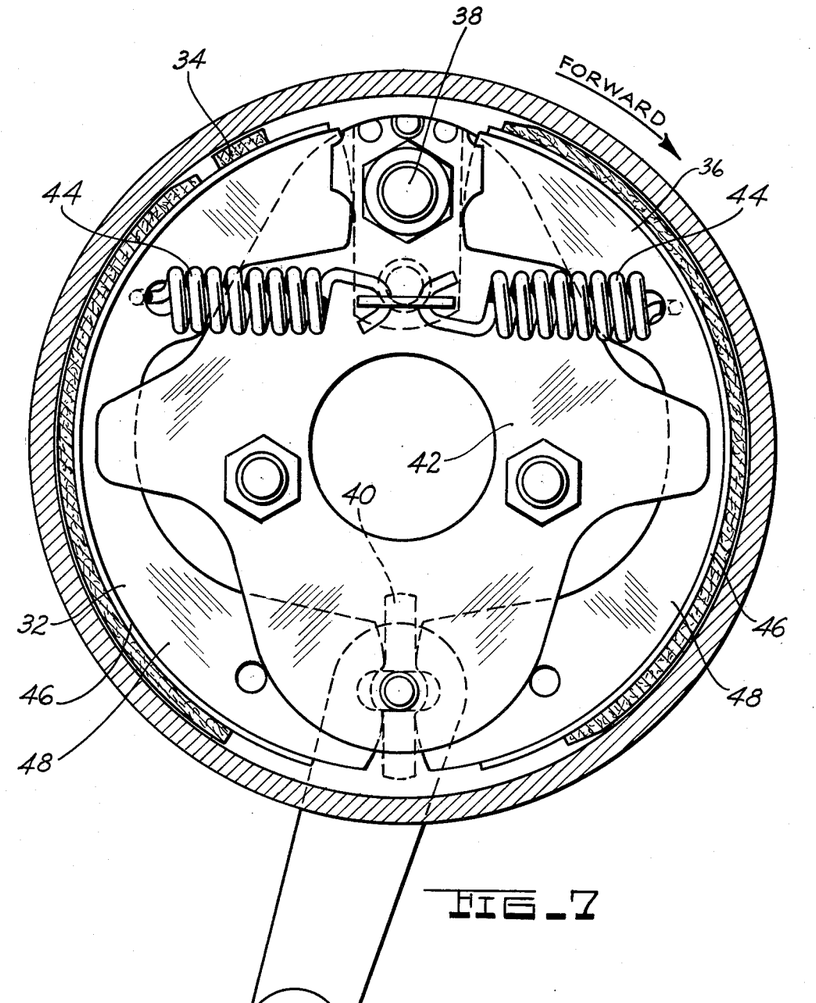
FIGURE 7 is a side elevation view of a typical tractor brake, non-servo construction, having the invention incorporated therein.

In the brake of FIGURE 7, the "leading" shoe 32, which is so called because it is the energizing shoe, has a segment 34 of metallic base friction material affixed to the rim of the shoe adjacent the anchoring end of the shoe. The trailing shoe 36, which is so called because it is de-energizing during brake application, is equipped with a full organic liner. Both shoes anchor at adjacent ends on a fixed anchor 38, and at the opposite ends they are applied by a mechanically actuated cam 40.

The shoes are supported laterally on a support plate 42 and are held in a normally retracted position by a return spring 44. Each shoe is T-shaped in cross section, and consists of an arcuate rim 46 and transverse strengthening web 48.

The wear resistance of this liner construction has been tested (see Chart 5). In the chart, there are compared two lining constructions, one differing from the other only by the addition of the wiper segment. The full organic liner, Test #1, completed only 485 stops and became inoperative. The combination liner, Test #3, however, completed more than 12 times the number of stops of the full organic liner and was still operative, having sustained only .009 in. wear.

*Chart 5*

| Test No. | Lining composition | Brake size and construction | Performance | Wear |
|---|---|---|---|---|
| 1 | (a) Leading shoe "OL". (b) Trailing shoe "OL". | 7″ x 1¾″ shoe brake | 485 stops in 31 minutes, lining faded out, starting pedal pressure—70 pounds, final pressure—140 pounds. | .003. |
| 2 | (a) Leading shoe "OP". (b) Trailing shoe "OP". | 7⁷⁄₁₆″ x 2¼″ | 6,030 stops in 4 hours, 18 minutes, starting pedal pressure—40 pounds, final pressure—75 pounds. | .028. |
| 3 | (a) Leading shoe "OP". (b) Trailing shoe "OP". (c) Wiper segment "ME". | 7″ x 1¾″ brake | 6,002 stops in 4 hours, 35 minutes, starting pedal pressure—45 pounds, final pressure—55 pounds. | .009—organic. .004—wiper segment. |
| 4 | Unknown | "Double disk" brake 6½″ | 1,215 stops in 0 hours, 51 minutes, initial pedal pressure—60 pounds, final pressure—200 pounds plus (faded). | Lining burned up. One of linings charred and was therefore destroyed. |

A few examples of appropriate segment sizes, and the suitable gap lengths are as follows:

*Chart 4.—For 9″ to 12″ diameter brakes*

| Wiper segment length | Position wiper segment | Gap size | |
|---|---|---|---|
| | | Organic liner thickness ³⁄₁₆″ | Organic liner thickness ¼″ |
| ½″ | #2 | ½″ | ⁹⁄₁₆″ |
| ¾″ | #2 | ½″ | ⁹⁄₁₆″ |
| ¾″ | #2½ | ⁹⁄₁₆″ | ⅝″ |
| ¾″ | #3 | ⅝″ | ¾″ |

WEAR RATE

As described the greater liner wear life resulting from use of this invention is attributed in part to the compounding of the organic segments on the secondary shoe. Another factor in improving the wear rate of the brake is the greater brake stability. This means that the foundation brakes are more evenly balanced insofar as their respective braking work loads are concerned.

The degree of wear rate improvement depends to a large extent upon whether the brakes are subjected to hard abusive use or moderate use. In the former case, the liner combinations of the invention are comparatively much more durable than the full organic liners equivalently used, whereas with moderate use the liner combinations more nearly approach the full organic liners equivalently used.

OTHER BRAKE CONSTRUCTIONS

The service life improvement is particularly good with the non-servo floating shoe brake and lining arrangement provided therein (see FIGURE 7).

When the organic liner was increased in size (Test #2), the organic liner could complete the test but had a wear of three times that of the smaller combination liner (Test #3).

The commercial disk brake, which was included for comparative purposes, could not complete the test schedule, and therefore wear data cannot be given since the liner was destroyed.

These tests will establish the utility of the combination liner in the non-servo brake construction. The tests further establish the remarkable durability of the liner when a wiper segment is added.

Figure 6:
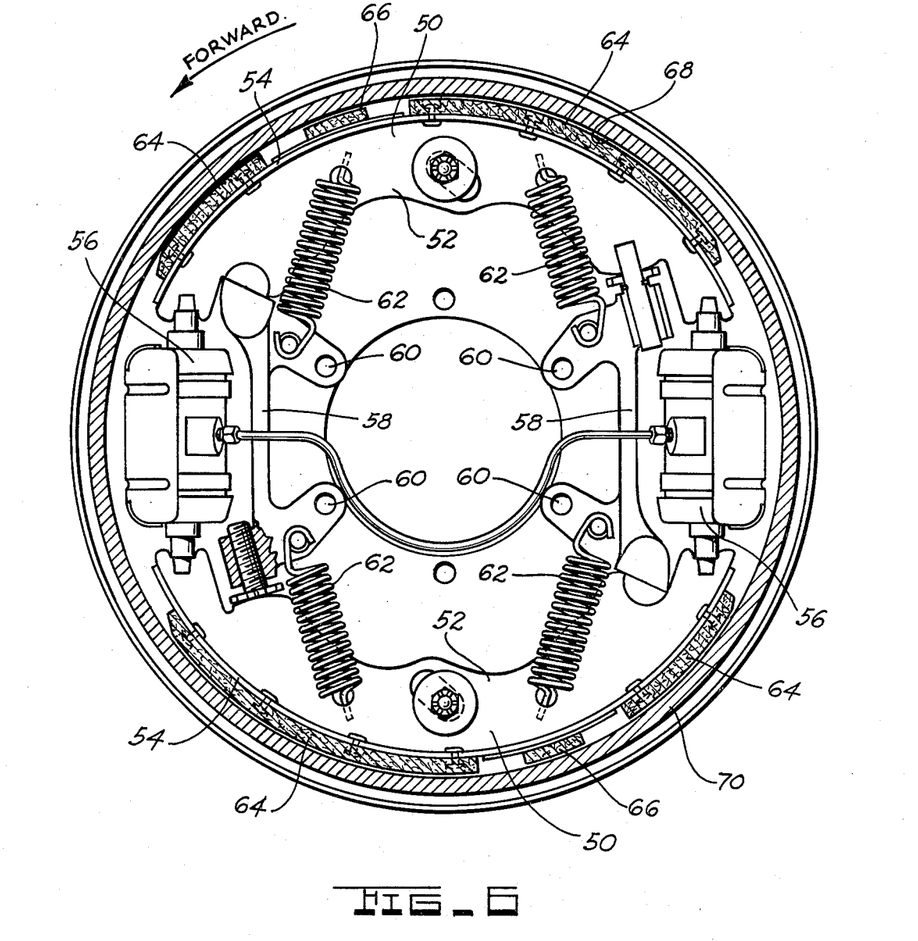
FIGURE 6 is a side elevation view of a two-leading shoe brake arrangement embodying the invention.

Referring next to FIGURE 6, the liner constructions can be adapted for the two leading shoe brake arrangement. Since both shoes are energizing shoes, the wiper segment is added to each shoe. The two shoes 50 each consist of a strengthening web 52 and an arcuate rim 54. Opposite ends of each shoe are actuated by wheel cylinders 56 having oppositely acting pistons (not shown) movable therein.

The shoes are anchored at each end on anchor brackets 58 which are fastened by bolts 60 to the undercarriage of the vehicle. Return springs 62 hold the shoes in a normally retracted position.

On the rims 54 of each shoe 50, 52 are segments of organic lining 64 and a wiper segment 66, all of which are engageable with an opposing cylindrical drum surface 68 of a rotatable drum 70.

The composition, size, placement and gap are established for this brake configuration in substantially the same manner as for the servo construction. The "wiper" segment is placed in a position depending upon the pressure and work load distribution properties of the lining segments, these being determined by the composition of the segments.

The size of the wiper segments is bracketed by the same considerations as those which apply with the servo construction, viz., the wiper segments should not exceed 18% of each shoe lining area or should not contribute directly a major amount of the braking work. The purpose of the wiper segments is to condition the braking surface between the opposing drum surface 68 and organic segments 64, and this can be accomplished within the percentage range stated, so that excessive noise, drum wear, and effectiveness build-up are avoided.

Figure 8:
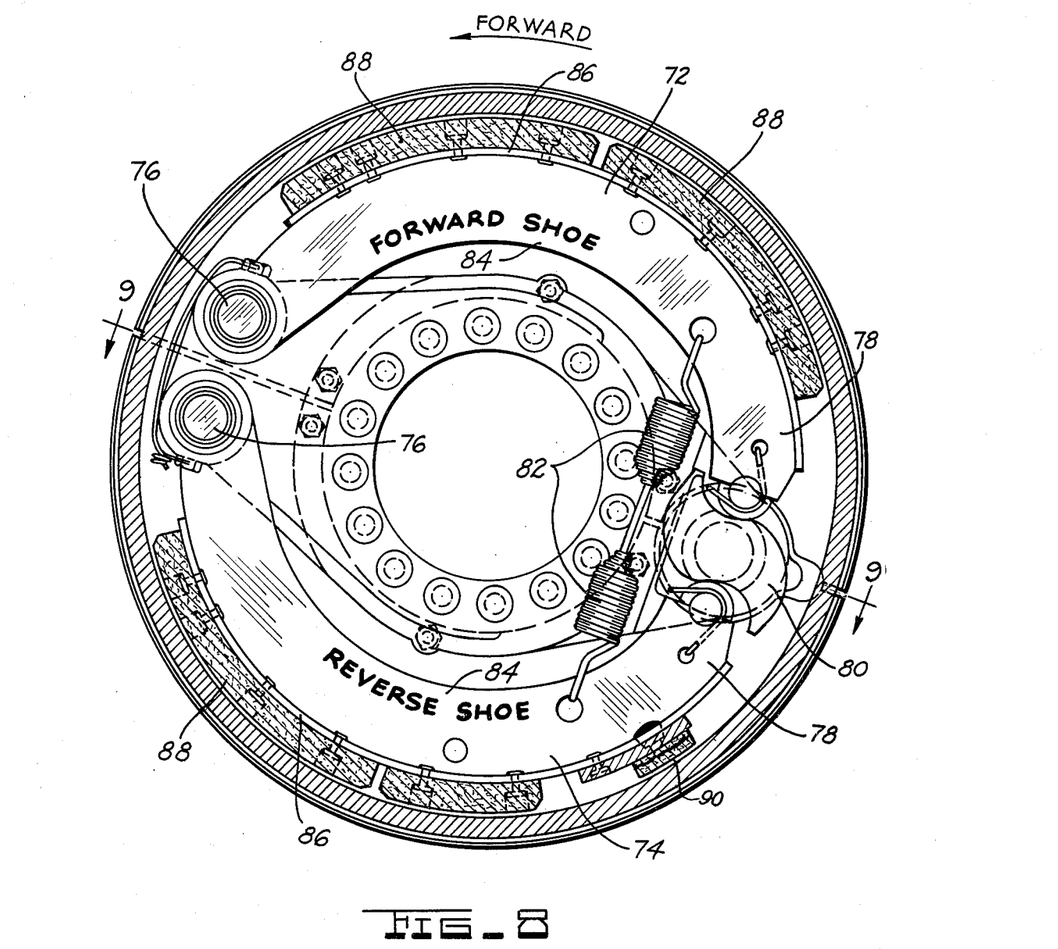
FIGURE 8 is a side elevation view of a fixed anchor non-servo brake extensively used on trucks and other heavy vehicles, this brake being shown with the invention incorporated therein.
Figure 9:
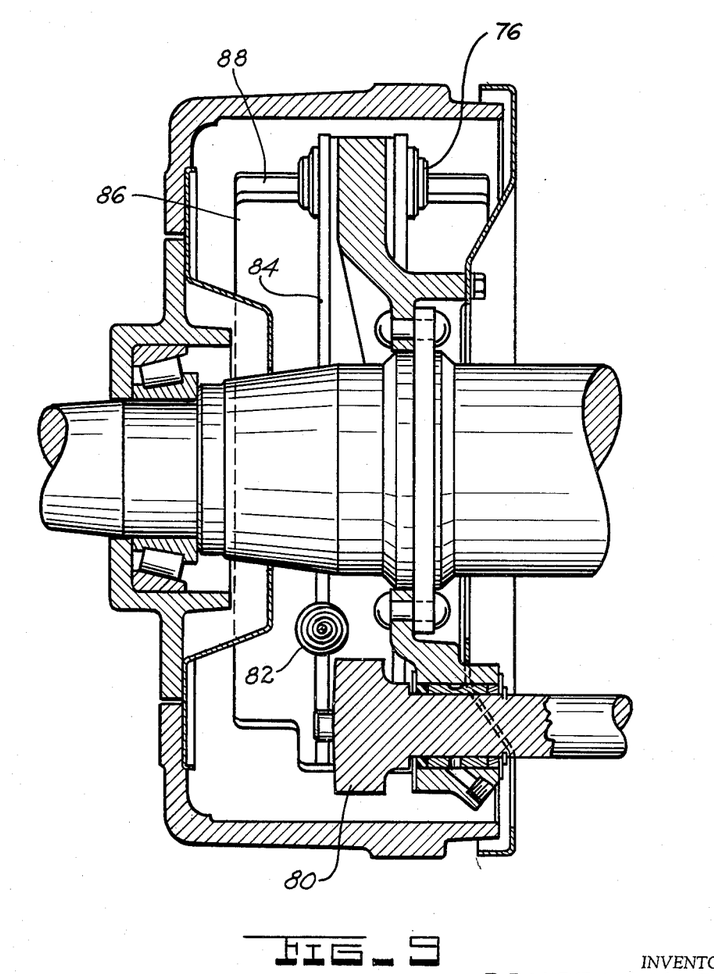
FIGURE 9 is a section view taken on line 9—9 of FIGURE 8.

The liner constructions can also be used with a fixed anchor non-servo brake configuration of the type shown in FIGURES 8 and 9. This brake is almost exclusively used for heavy truck and trailer applications.

The brake includes a leading or "forward" shoe 72 and trailing or reverse shoe 74 each having a fixed anchor pin 76 which provides a pivot support for the respective shoe.

The ends 78 of the shoes are spread apart by S-cam 80 which is mechanically turned to actuate the brake. A return spring 82 holds the shoes in a normally retracted or released position.

Each shoe has a strengthening web 84 and arcuate rim 86 with segments 88 of organic friction material secured thereto. A wiper segment 90 is provided on the applying end of the trailing shoe (the lower shoe in FIGURE 8).

With wiper segments no greater than 18% of the total trailing shoe friction lining surface; substantial improvements in fade resistance, recovery, and effectiveness have been made.

SUMMARY OF DATA

In the following Chart 6, there are summarized in Section "a" the compositions of organic friction material which have been used in vehicle tests; in Section "b" the compositions of powdered metal wiper segments which have been used in such tests; and in Section "c" the combinations of organic and wiper materials, together with the sizes, locations, etc. of the wipers.

These examples all apply to the brake configurations shown and are illustrative of the invention. Each example fulfills the mathematical relationship set forth previously and all of the example combinations provide the performance and wear improvements described.

*Chart 6*

SECTION a.—ORGANIC FORMULAE (PERCENT BY WT.)

| Formula | OA | OB | OC | OD | OE | OF | OG | OH | OJ | OK | OL | OM | ON |
|---|---|---|---|---|---|---|---|---|---|---|---|---|---|
| Asbestos | 40.7 | 40.7 | 42.4 | 39.4 | 37.7 | 61.8 | 59.2 | 57.2 | 61.0 | 44.2 | 42.2 | 43.0 | 42.0 |
| Resin | 20.0 | 21.4 | 21.4 | 23.0 | 24.4 | 19.6 | 19.6 | 21.6 | 19.6 | 19.6 | 21.6 | 23.5 | 27.6 |
| Rubber scrap | 7.1 | 7.1 | 7.1 | 7.1 | 7.1 | | | | | | | 10.6 | 8.6 |
| Neoprene scrap | | | | | | 11.2 | 11.2 | 11.2 | 11.2 | 11.2 | 11.2 | | |
| Talc [1] | | 27.4 | 27.4 | | 27.4 | | | | | | | | |
| Whiting [2] | 28.8 | | | 28.8 | | | | | | 15.0 | 15.0 | 22.0 | 21.8 |
| Alumina [3] | 3.4 | 3.4 | 1.7 | 1.7 | 3.4 | | | | 0.8 | | | 0.9 | |
| Friction dust [4] | | | | | | 7.4 | 7.4 | 7.4 | 7.4 | 7.4 | 7.4 | | |
| Graphite | | | | | | 0 | 2.6 | 2.6 | 0 | 2.6 | 2.6 | | |
| Total | 100.0 | 100.0 | 100.0 | 100.0 | 100.0 | 100.0 | 100.0 | 100.0 | 100.0 | 100.0 | 100.0 | 100.0 | 100.0 |
| Application | (5) | (5) | (5) | (6) | (5) | (7) | (7) | (7) | (7) | (7) | (7) | (7) | (7) |

| Formula | OO | OP | OQ | OR | OS (H3133J) | OT (H3133H) | OU (H3133) | OV (2651) | OW (H3133E) | OX (9051G) | OY (B4115) |
|---|---|---|---|---|---|---|---|---|---|---|---|
| Asbestos | 56.9 | 45.0 | 75.7 | 37.0 | 38.0 | 65.5 | 65.6 | 38.5 | 51.8 | 41.2 | 26.0 |
| Resin | 16.0 | 16.3 | 17.6 | 16.8 | 21.0 | 19.0 | 19.0 | 15.5 | 16.7 | 21.0 | 23.9 |
| Rubber scrap | | | | | 20.0 | 14.5 | 7.2 | | 7.0 | 11.5 | 4.47 |
| Neoprene scrap | 13.1 | | | | | | 7.2 | | 7.0 | | 4.47 |
| Talc | | | | 13.5 | | | | | | | |
| Whiting | | | | 13.5 | 17.6 | | | | 28.2 | | 34.6 |
| Rottenstone | | | | 6.7 | | | | | | | |
| Barytes | | 21.0 | | | | | | | | | |
| Alumina | 4.7 | 4.2 | | | 1.0 | 1.0 | 1.0 | | 1.7 | 3.4 | |
| Friction dust | | 7.8 | 6.7 | 10.3 | | | | 6.6 | | 5.6 | |
| Graphite | | | | 2.2 | 2.5 | | | | | | 4.46 |
| Leaded litharge | 9.3 | | | | | | | | 8.5 | | |
| Brass chips | | 5.7 | | | | | | | 7.3 | 2.3 | 2.10 |
| Filler (stock dust) | | | | | | | | 11.2 | | 2.2 | |
| Total | 100.0 | 100.0 | 100.0 | 100.0 | 100.0 | 100.0 | 100.0 | 100.0 | 100.0 | 100.0 | 100.0 |
| Application | (5) | (5) | | | | | | | | | |

[1] 3MgO-4SiO$_2$-H$_2$O.
[2] CaCO$_3$.
[3] Al$_2$O$_3$.
[4] Cashew polymer.
[5] Primary.
[6] Primary or secondary.
[7] Secondary.
[8] Primary and secondary.

SECTION b.—INORGANIC WIPER SEGMENT COMPOSITIONS (PERCENT BY WT.)

| Formula | MA' | MB' | MC' | MD' | ME' | MF' | MG' | MH' | MJ' | MK' | ML' uncoined | MM' |
|---|---|---|---|---|---|---|---|---|---|---|---|---|
| Iron powder | 60 | 60 | 64 | 60 | 71 | | | | 74 | 71 | 60 | |
| Copper powder | | | | | | 70 | 80 | 55 | | | | 76 |
| Graphite | 15 | 15 | 15 | 15 | 15 | 20 | 20 | 9 | 15 | 15 | 15 | 9 |
| Bismuth | 11 | 11 | 11 | 11 | | | | 15 | 11 | | 11 | |
| Mullite | 14 | | 5 | | 14 | | | 16 | | | 14 | 15 |
| Raw kyanite | | 14 | | | | 10 | | | | 14 | | |
| Magnesite | | | | 14 | | | | | | | | |
| Lead | | | 5 | | | | | | | | | |
| Tin | | | | | | | | 5 | | | | |

SECTION c.—COMBINATION LINING CHART

Servo Brake

| Combination number | Primary shoe liner | Secondary shoe liner | Wiper segment (secondary shoe) |
|---|---|---|---|
| 1 | OA | OG | MA'—¾" in #3 position. |
| 2 | OA | OK | MA'—1¼" in #3 position. |
| 3 | OD | OK | MA'—1" in #3 position. |
| 4 | OD | OL | MA'—¾" in #3 position. |
| 5 | OD | OL | MA'—1" in #3 position. |
| 6 | OA | OG | MA'—¾" in #3 position, both primary and secondary. |
| 6-A | OA | OG | MA'—¾" in secondary and ½" in primary—#3 position. |
| 7 | OA | OG | MA'—¾" in #2 position—primary ¾" in #3 position—secondary. |
| 8 | OA | OG | MA'—¾" in #3 position—primary ¾" in #2 position—secondary. |
| 9 | OB | OG | MA'—¾" in #3 position. |
| 9-A | OB | OG | MA'—Same as OCM-9 except ¾" wiper in #2½ (center) position. |
| 9-B | OB | OG | MA'—Same as OCM-9 except ½" wiper in #2½ (center) position, ⅝ air gap, ¾" overhang w./o. eccentrics. |
| 9-C | OB | OG | MA'—Same as OCM-9 except ¾" wiper in #2½ (center) position, w./eccentrics. |
| 10 | OB | OT | MA'—¾" in #3 position. |
| 10-A | OB | OU | Do. |
| 11 | OE | OG | Do. |
| 12 | OD | OS | Do. |
| 13 | OA | OG | MC'—¾" in #3 position. |
| 14 | OA | OH | MA'—¾" in #3 position. |
| 15 | OC | OF | Do. |
| 15-A | OC | OF | MA'—Same as OCM-15 except ⅝ air gap, 1 1/16" overhang (flap) on EF w./o. eccentrics (¾" overhang on EM). |
| 15-B | OC | OF | MA'—Same as OCM-15 except ½" wiper #2 position, ½" air gap, ½" overhang (flap) w./o. eccentrics. |
| 15-C | OC | OF | MA'—Same as OCM-15 except ¾" wiper in #2½ (center) position, ⅝" air gap, 11/16" overhang (flap) w./o. eccentrics. |
| 16 | OB | OH | MA'—¾" in #3 position. |
| 16-A | OB | OH | MA'—(¾" long, ¼" below center of #3 position) corrected toe segment, drilling and air gap. |
| 16-B | OB | OH | MA'—Same as #16-A except revised (flap-gap) configuration for operation w./o. eccentrics. |
| 16-C | OB | OH | MA'—Same as OCM 16-A except ¾" wiper in #2½ position, ⅝" air gap, 7/16" overhang (no chamfer). |
| 17 | OB | OH | MA'—¾" in #3 position (no eccentrics). |
| 18 | OB | OM | MA'—Double wiper (¾" long in #3 position, primary and secondary). |
| 19 | OB | ON | MA'—½" long, #3 position, long overhang at wiper (w./eccentrics). |
| 20 | OO | OH | MA'—¾" long, #3 position. |
| 21 | OB | OJ | Do. |
| 22 | OP | OP | Do. |
| 23-A | OB | OH | MF'—Same as OCM-16A except wiper formula. |
| 23-B | OB | OH | MF'—¾" long in exact #4 position, 1" air gap to organic, no chamfer, no toe organic segment. |
| 23-C | OB | OH | MF'—Same as OCM-16C except wiper formula. |
| 24 | OB | OG | MF'—Same as OCM-23A except higher friction secondary—same organics as OCM-9 series. |
| 25-A | OB | OH | MM'—Same as OCM-16A except wiper formula. |
| 26-A | OB | OG | MM'—OCM-9 organics, OCM-16A configuration. |
| 27-A | OC | OG | MF'—OCM-15 organics, OCM-16A configuration. |
| 28-A | OC | OG | MM'—OCM-15 organics, OCM-16A configuration. |
| 29 | OB | OG | MF'—Same as OCM-21 except wiper formula. |
| 30 | OW | OW | MA'—¾" in #3 position. |
| 31 | OB | OF | MM'—Same as OCM-21 except wiper formula. |
| 32 | OB | OH | MA'—¾" long, #2 position. |
| 33 | OB | OH | MA'—½" long, #2 position. |
| 34 | OP | OP | MA'—¾" long, at heel (anchor), #3 position. |
| 35 | OC | OF | MB'—¾" long, #3 position, ⅝" air gap, 5/16" overhang. |
| 36 | OC | OF | MD'—¾" long, #3 position, ¾" air gap, 5/16" overhang. |
| 37 | OC | OF | MF'—¾" long, #3 position. |
| 38 | OC | OF | ME'—¾" long, #3 position, ¾" air gap, 5/16" overhang. |
| 39 | OB | OG | MG'—2¼" long, #2 position. |
| 40 | OC | OF | MF'—¾" in #3 position. |
| 41 | OC | OF | MD'—¾" in #3 position. |
| 42 | OC | OF | ME'—¾" in #3 position. |
| 43 | OC | OF | MJ'—¾" in #3 position. |
| 44 | OB | OH | MH'—¾" in #3 position. |
| 45 | OC | OF | MK'—¾" in #3 position. |
| 46 | OC | OF | MB'—¾" in #3 position. |

Non Servo

| Combination number | Leading shoe | Trailing shoe | Wiper segment (leading shoe) |
|---|---|---|---|
| 47 | OP | OP | MA'—¾" segment, heel end of leading shoe. |

Twinplex

| Combination number | Leading shoe | Leading shoe | Wiper segment (each leading shoe) |
|---|---|---|---|
| 48 | OX (9051G) | OX (9051G) | MA'—(1½") see drawing for approx. position. |

"S" Cam

| Combination number | Leading shoe | Trailing shoe | Wiper segment (trailing shoe) |
|---|---|---|---|
| 49 | OY (B4115) | OY (B4115) | Cam end trailing shoe. |

From these selected examples of the invention, it will be apparent that numerous modifications and revisions may be made without departing from the underlying principles of the invention. It is intended to include within the scope of the following claims such revisions and departures as incorporate the herein described principles and do not depart from the underlying teachings hereof.

I claim:

1. In a friction producing device: a first member having a generally smooth friction producing surface, a second member spaced apart from said surface of said first member, said second member having a friction producing ingredient held in an organic resin binder forming a friction producing surface on which "fade" producing materials are formed at elevated temperatures, one of said first and second members being movable relative to the other of said members, means for moving said surfaces of said members together with sufficient rubbing action to generate "fade," and means for distributing a dust between said surfaces at least periodically during use, said dust being of a material which does not soften and smear to any significant extent at the temperature of the "fade" condition and said dust being of a particle size and amount to project out of the surface of said organic resin binder into engagement with said surface of said first member to bridge said "fade" producing materials.

2. In a friction producing device: a first member having a generally smooth friction producing surface, a second member spaced apart from said surface of said first member, said second member having a friction producing ingredient held in an organic resin binder forming a friction producing surface on which "fade" producing materials are formed at elevated temperatures, one of said first and second members being movable relative to the other of said members, means for moving said surfaces of said members together with sufficient rubbing action to generate "fade," and means for distributing a dust between said surfaces at least periodically during use, said last mentioned means comprising a block of dust producing material positioned on said second member in a position where its surface engages said surface of said first member when said members are forced into engagement under pressure, said block being of a material which during use produces a dust which does not melt at the temperature of the "fade" condition to any significant extent and said dust being of a particle size and amount to project out of the surface of said organic resin binder into engagement with said surface of said first member to bridge said "fade" producing materials.

3. A friction producing device substantially in accordance with claim 2 wherein the block of dust producing material is made principally of a powdered metal.

4. The structure of claim 2, in which said block has a surface area of 3 to 18% of the friction producing surface of said second member.

5. The structure of claim 2, in which said block has a surface area of from 4.5 to 11.5% of the friction producing surface of said second member.

6. In a brake having a drum and an arcuate brake shoe movable relative to each other, a liner engageable with said drum and comprising a fibrous resin-bonded friction material on said shoe and a relatively narrow block of a material which does not soften at the brake operating temperatures and being formed of strong, heat-resistant powdered metal and extending transversely of said liner for engagement with said drum, said block having the property of powdering under high pressure rubbing contact with the opposing drum surface whereby during the braking operation, the powder or dust from said block is distributed by the drum over the said fibrous resin-bonded friction material, said dust being of a material which does not soften at the brake operating temperatures to become embedded in the fibrous resin-bonded friction material and bridge fade producing materials between said drum and liner.

7. In a brake, the combination of two arcuate articulated T-section brake shoes, one of said shoes being the primary brake shoe, and the other of said shoes being the secondary brake shoe, a resin-bonded friction material provided as friction material lining on said primary brake shoe, a resin-bonded friction material on said secondary shoe, and a relatively narrow block of a powdered metal material extending transversely of one of said liners, said block having an exposed surface area of from 1½ to 10% of the total surface area of said liners and being of a material which does not soften or liquefy at the brake operating temperature.

8. In a brake having a drum and an arcuate brake shoe movable relative to each other, a liner engageable with said drum and comprising a fibrous resin-bonded friction material on said shoe and a relatively narrow powdered metal block of a powdered material extending transversely across said liner with spaces between said block and said friction material, said block being substantially free of materials which melt or soften at the temperatures produced during operation of the brake, whereby contact between the block and said drum and contact between said friction material and said drum is concurrent during braking operation irrespective of dimensional changes of the brake members.

9. In a brake having articulated primary and secondary brake shoes, a combination liner construction comprising an organic base friction material supported on said primary brake shoe, and a powdered metal block supported on said secondary shoe, said block being substantially free of materials which melt or soften at the temperatures produced during the operation of the brake, and having an arcuate length calculated according to the following relation:

$$L=\left(\frac{12T_0}{\mu_m R_D D_2 W \sin \delta}\right)\left(\frac{k_1}{1-k_1}\right)$$

where, $L=$ arcuate length of block expressed in inches.
$T_0=$ total braking torque expressed in terms of lbs.-ft.
$\mu_m=$ coefficient of friction block.
$R_D=$ drum radius.
$W=$ width of liner.
$D_2=$ maximum unit pressure on the secondary shoe at the $T_0$ used in the expression and expressed in terms of lbs./in.$^2$.
$\delta=$ angular location of midpoint of block from anchor, and
$k_1=$ the percent of total torque contributed by the powdered metal block.

Said arcuate length being no greater than that using the values of $\mu_m=0.15$ and the corresponding $k_1=0.10$.

10. In combination with a brake drum and an arcuate shoe; a liner for said shoe engageable with said drum and comprising a resin-bonded frictional material on which "fade" producing materials are formed at elevated temperatures, means for distributing a dust between the surfaces of said liner and drum at least periodically during use, said last mentioned means comprising a block positioned transversely of said liner for engagement with said drum, and means for moving said liner and block against said drum with sufficient rubbing action to generate "fade," said block being formed principally of a powdered metal material which during use produces a dust which does not melt to any significant extent at the temperature of the "fade" condition and being of a particle size and amount to project out of the surface of said liner into engagement with said surface of said drum to bridge said "fade" producing materials on said liner.

11. The structure of claim 10, in which the predominant powdered metal is selected from the group consisting of copper, iron and aluminum.

12. The structure of claim 10, in which graphite is added to the powdered metal.

13. The structure of claim 10, in which a refractory abrasive oxide is embedded in the powdered metal block.

14. The structure of claim 10, in which raw kyanite is embedded in the powdered metal block.

15. The structure of claim 10, in which mullite is embedded in the powdered metal block.

16. The structure of claim 10, in which the powdered metal material is predominantly powdered iron and powdered bismuth and said block also contains a ceramic abrasive material.

References Cited in the file of this patent

UNITED STATES PATENTS

| | | |
|---|---|---|
| 1,672,486 | Ewing | June 5, 1928 |
| 1,672,538 | Novak | June 5, 1928 |
| 1,844,461 | Chase | Feb. 9, 1932 |
| 1,899,239 | De Lukacsevics | Feb. 28, 1933 |
| 1,923,872 | Loughead | Aug. 22, 1933 |
| 1,950,262 | Norton | Mar. 6, 1934 |
| 2,012,259 | Dennman | Aug. 27, 1935 |
| 2,122,405 | Brokius et al. | July 5, 1938 |
| 2,355,419 | Bruce | Aug. 8, 1944 |
| 2,428,298 | Spokes et al. | Sept. 30, 1947 |
| 2,554,291 | Bradley et al. | May 22, 1951 |
| 2,713,923 | Eksergian et al. | July 26, 1955 |
| 2,784,105 | Stedman et al. | Mar. 3, 1957 |

FOREIGN PATENTS

| | | |
|---|---|---|
| 768,743 | Great Britain | Feb. 20, 1957 |